March 7, 1961 G. W. COPE 2,973,872
TRANSITION COUPLING
Filed March 11, 1958 2 Sheets-Sheet 1
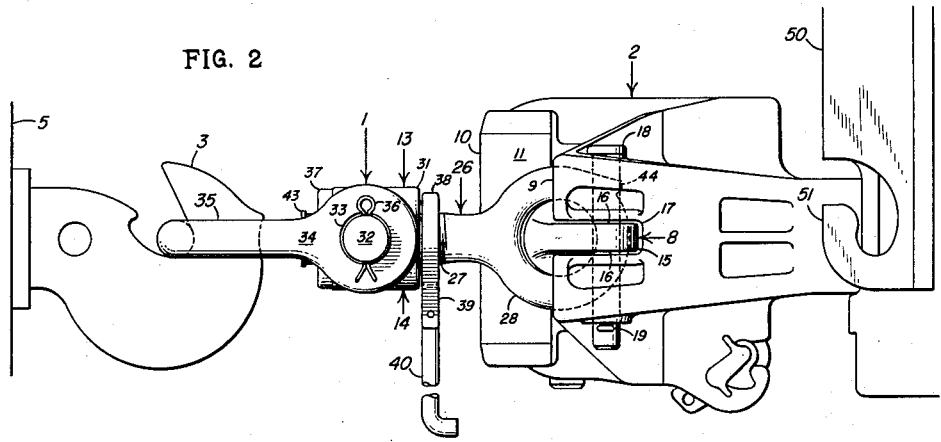
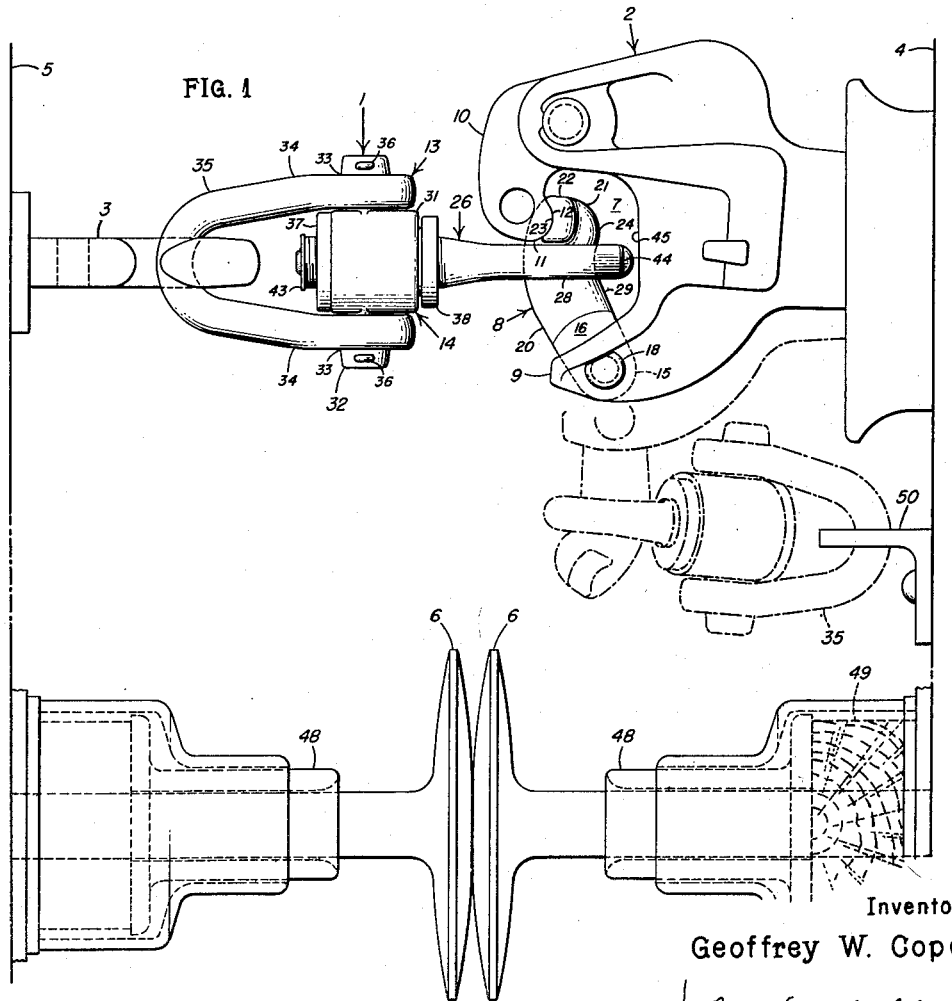
Inventor:
Geoffrey W. Cope
By Wilmer Mechlin
his Attorney March 7, 1961 G. W. COPE 2,973,872
TRANSITION COUPLING
Filed March 11, 1958 2 Sheets-Sheet 2
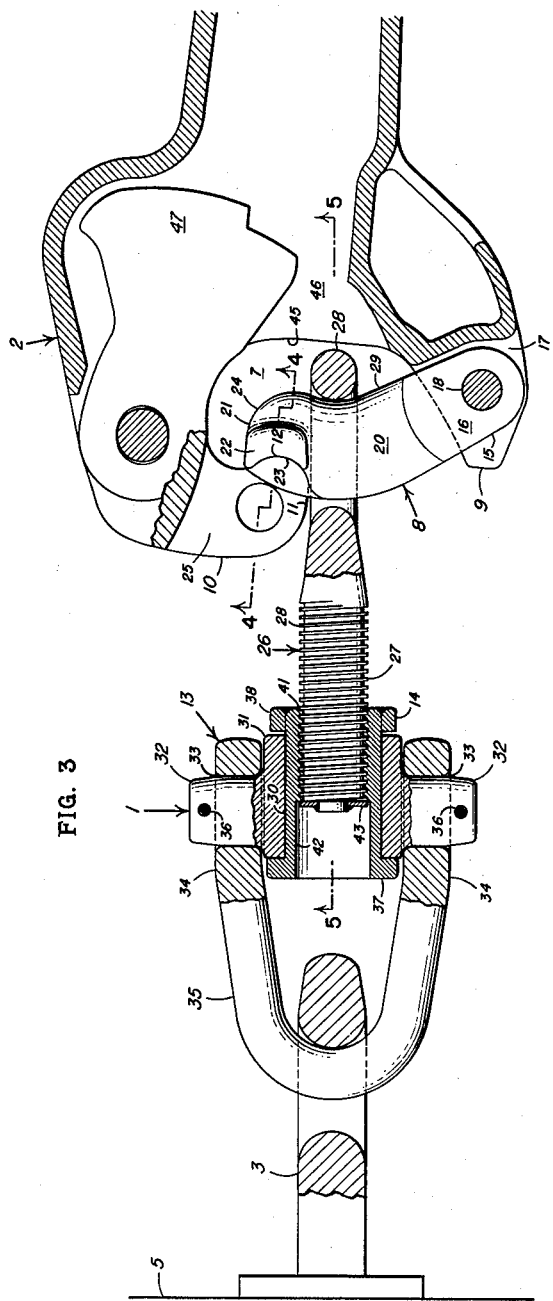
FIG. 3
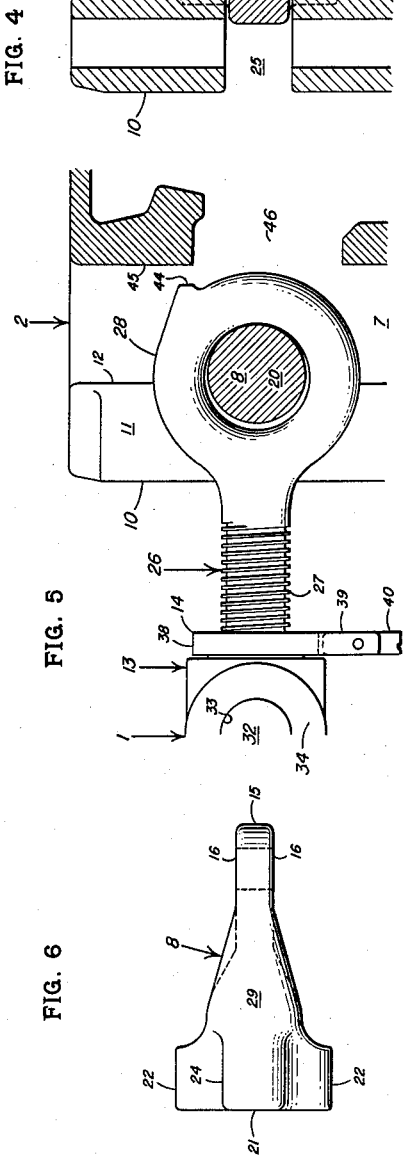
FIG. 4
FIG. 5
FIG. 6
Inventor:
Geoffrey W. Cope
By Wilmer Mechlin
his Attorney

United States Patent Office 2,973,872
Patented Mar. 7, 1961

2,973,872

TRANSITION COUPLING

Geoffrey W. Cope, Williamsville, N.Y., assignor to Symington Wayne Corporation, Salisbury, Md., a corporation of Maryland Filed Mar. 11, 1958, Ser. No. 720,579

18 Claims. (Cl. 213—112)

This invention relates generally to coupling devices for railway vehicles and more particularly to transition couplings for connecting automatic knuckle couplers and draw hooks.

Introduced in this country in the late 19th century and for many years standard in interchange service, automatic knuckle couplers are not widely used on foreign railroads. Instead, vehicles on foreign railroads by and large are equipped with fixed draw hooks flanked by buffers and are coupled together by screw couplings, usually in the form of a foldable linkage having a turnbuckle type of takeup device. However, as in this country before passage of the Safety Appliance Act, the rate of injury attendant the use of screw couplings, which can be coupled and uncoupled only by a man going between the cars, is so high that in France, for one, the pension payments of the national railways to disabled workmen exceed the operating payroll. As a consequence, foreign railroads are much interested in converting to automatic knuckle couplers, but since few, if any, are capable economically of making the conversion all at once, need a transition coupling for coupling converted to unconverted vehicles during the changeover.

Although a number of transition couplings have been suggested for the above purpose, the problem is difficult. Logically, during the transition period, cars equipped with automatic couplers should carry transition couplings for coupling them at will to draw hook equipped cars, while not interfering with their coupling with other cars equipped with automatic couplers. Furthermore, a transition coupling, while foldable so that any buffing forces can be taken by the flanking buffers rather than through the coupling, should incorporate means for taking up slack between the buffers to inhibit injury to passengers and minimize damage to lading. However, none of the transition couplings thus far introduced or proposed has satisfactorily solved the problem, due in good measure to the relatively greater projection from a car end of a knuckle coupler than a fixed draw hook, with the consequent limitation with buffers contacting in the space available for the mechanism of the transition coupling.

The primary object of the present invention is to provide an improved transition coupling which is attachable to an automatic knuckle coupler for coupling it at will to a draw hook and when not so used can be swung out of the way and will not interfere with coupling of the associated coupler to another automatic coupler.

Another object of the invention is to provide an improved transition coupling of the type just described which is both foldable under buffing forces, so that such forces will be taken by the associated buffers, and incorporates takeup means for taking up slack between the buffers.

An additional object of the invention is to provide an improved transition coupling which is connectable to the guard arm of an automatic knuckle coupler for swinging horizontally relative thereto, whereby the coupling may be swung to one side out of the way so as not to interfere with coupling of the associated coupler with another automatic coupler.

A further object of the invention is to provide an improved transition coupling swingably connectable to a guard arm of an automatic knuckle coupler and pulling through an element spanning the space between the guard arm and knuckle of the coupler, which is both foldable under buffing forces and carries means cooperating with the coupler under such forces for forcing the coupling to fold downwardly and thus prevent its accidental disengagement from a draw hook.

Another object of the invention is to provide an improved transition coupling which not only may be swung outwardly but may be attached when not in use to a car end at one side of the automatic coupler without interfering with automatic action of the latter and, while of adequate strength to meet any conditions to which it may be subjected in service, due to its construction and arrangement minimizes the manual effort required to connect it to a draw hook.

An additional object of the invention is to provide an improved transition coupling which, while removably connectable for relative horizontal swinging to a guard arm of an automatic coupler, requires such minor modification of the automatic coupler as in nowise to impair the operation of the latter on removal of the coupling at the end of the transition period.

Other objects and advantages of the invention will appear hereinafter in the detailed description, be particularly pointed out in the appended claims and be illustrated in the accompanying drawings, in which:

Figure 1 is a fragmentary plan view of the ends of a pair of railway vehicles equipped respectively with a fixed draw hook and an automatic knuckle coupler and connected by a preferred embodiment of the transition coupling of the present invention;

Figure 2 is a side elevational view of the structure of Figure 1 with the buffers removed;

Figure 3 is a fragmentary plan view on an enlarged scale of the coupling and associated structure of Figure 2 with portions broken away and shown in section to more clearly illustrate certain of the details of construction;

Figure 4 is a fragmentary vertical sectional view taken along the lines 4—4 of Figure 3;

Figure 5 is a fragmentary vertical sectional view taken along the lines 5—5 of Figure 3; and Figure 6 is a front elevational view of the connecting element of the coupling removed from the othert structure.

Referring now in detail to the drawings, in which like reference characters designate like parts, the improved transition coupling of the present invention is adapted for coupling any vehicle equipped with an automatic knuckle coupler to one equipped with a draw hook. For purposes of illustration, the transition coupling, designated as 1, has been applied to connect an automatic knuckle coupler 2 of an export type, which, while basically the same as, differs in some respect from an A.A.R. standard type E coupler, to a conventional draw hook 3, the coupler 2 being movably mounted in the usual manner in and the draw hook 3 fixed to the ends 4 and 5, respectively, of the railway vehicles (not shown) to which they are applied. In accordance with the general practice of foreign railroads, the coupler 2 and draw hook 3 are each flanked by a pair of buffers 6 of the conventional double stroke type, the confronting, coacting buffers at only one side here being illustrated.

Most transition couplings heretofore introduced or proposed have been designed to be pivotally connected to the knuckle of an automatic knuckle coupler, resulting not only in interference with coupling of a pair of automatic couplers so equipped, but in reducing to a minimum the space between the coupler and draw hook available for any mechanism in the transition coupling, with consequent elimination in such couplings of the takeup feature embodied in a conventional screw coupling. This deficiency in prior transition couplings in part is eliminated here by so connecting the transition coupling 1 to the coupler 2 as to utilize to the maximum the space available within the throat 7 of the coupler for increasing the length of the transition coupling. While, as will be noted from Figure 1, the coupler, when connected to a draw hook, is caused to be angled some 5 degrees to one side, this does not impair the action of the coupler and is more than compensated for by the horizontal play obtainable in the connection.

Basically, the transition coupling 1 is comprised of a dog or connecting member or element 8 connected to a guard arm 9 of the coupler 2 for swinging into or clear of the throat 7 of the coupler and adapted, when in the throat and with the coupler knuckle 10 closed, to span the space between the guard arm and knuckle and bear against the inner or rear face 11 of the nose 12 of the knuckle. Forming the balance of the transition coupling 1 is a vertically foldable linkage 13 which at one end is pivotally connected for relative vertical pivoting to the dog 8 and at the other is connectable to the draw hook 3, the linkage in operative or pulling position extending or projecting into the throat 7 of the coupler. The linkage 13 in most applications also is longitudinally adjustable and for that purpose embodies or incorporates takeup means 14 for enabling the linkage to be extended initially for application to the draw hook 3 and thereafter taking up the slack between the confronting buffers 6.

In the illustrated embodiment, the dog 8 has its end which is pivotally or swingably connected to the guard arm 9 formed as a boss or hub 15 having substantially flat and parallel upper and lower surfaces 16, the boss being fittable into a substantially horizontally directed forwardly opening slot 17 extending transversely through the guard arm 9 intermediate and preferably substantially midway between the latter's vertical extremities. Releasably or removably connected to the guard arm 9 for swinging or pivoting relative thereto substantially horizontally or about a substantially vertical pivot by a vertically directed pivot pin 18 held in place by a cotter pin or like means 19, the dog is thickened outwardly of its boss 15 to provide it with a relatively thick body 20, which is substantially circular in cross-section and which terminates outwardly in a free end portion 21 carrying preferably integral stop means, here in the form of a pair of opposed vertically directed shoulders or lugs 22, one upstanding and the other downstanding from the free end portion 21. Designed to bear against the rear face 11 of the nose 12 of the knuckle 10, each of the stop shoulders 22 has a forwardly facing arcuately concave cavity or seat 23 conforming in curvature to and seating that face. For resisting bending under vertical forces about its boss, the dog 8 preferably has a horizontally directed centering rib or tongue 24 vetrically intermediate and projecting forwardly of the shoulders 22 and adapted to seat in a rearwardly opening recess or slot 25 in the knuckle nose 12 when the rear face 11 of the latter, above and below the recess, is seated in the seats 23.

The illustrated vertically foldable linkage 13 includes an eye-bolt 26 having a threaded stem or shank 27 and connected for substantially vertical swinging or pivoting by its eye 28 to the dog 8, the eye 28 being slidable over the boss 15 onto the body 20 of the dog 8 before the latter is applied to the coupler 2 and thereafter being limited in outward movement relative to the dog by the stop shoulders 22. To minimize lateral shifting of the eye 28 of the eye-bolt 26 relative to the dog 8 when the transition coupling is under draft forces, the dog preferably is of somewhat C-shape in plan and bowed, bent or curved rearwardly towards either end from a point on its body 20 adjacent the shoulders 22, the eye thus automatically positioning itself under draft forces by sliding from either side along the arcuately concave rear edge 29 of the dog to the point of maximum forward projection of the latter.

Encircling and threadedly engaging the threaded stem 27 of the eye-bolt 26 and forming therewith part of the takeup means 14, is an internally threaded adjusting sleeve or bushing 30 which in turn is encircled by and rotatable in a collar 31. The collar carries a pair of oppositely directed outstanding or radially projecting trunnions 32 which are adapted to be received or seated in openings or holes 33 in the legs 34 of and thereby be journalled in or pivotally connected to a clevis or yoke 35, the legs 34, when straddling the collar 31 and seating the trunnions 32 in their correspondingly aligned openings 33, being held in position by suitable retainer means such as the disclosed cotter pins 36.

Adapted to drop over and connect to the draw hook 3, the clevis 35 and with it the collar 31 are limited in forward axial movement relative to the sleeve 30 by an outstanding annular flange 37 on and preferably integral with the front end of the sleeve. Relative axial shifting of the collar and sleeve in the opposite direction is limited by an annular band or ring 38 welded or otherwise fixed to and projecting radially from the sleeve 30 so as, with the flange 37, to embrace the axial ends of the collar 31. The band 38 preferably has a projecting bifurcated portion 39 in which is pivotally or otherwise connected the inner end of a lever 40 for turning the sleeve on the threaded stem 27 of the eye-bolt 26 to extend or contract the linkage 13.

With the above construction, after the clevis 35 has been engaged with the draw hook 3, the sleeve 30 is rotated or turned on the shank 27 of the eye-bolt 26 by the lever 40 in a direction to contract the coupling and take up the slack between the confronting buffers 6. In a conventional installation and with the coupling extended sufficiently for the clevis 35 to be engaged with the draw hook 3, the slack between the buffers initially will be about 2⅞ inches, leaving the illustrated coupling with about ⅛ inch of extra takeup when the buffers touch or contact. Although not essential, it is preferred that the sleeve 30 be limited in outward movement relative to the eye-bolt 26 so as to prevent accidental disassembly of the coupling, once it has been installed. This can readily be provided for by limiting the internal threading of the sleeve to the end portion 41 thereof toward the eye 28 of the eye-bolt 26 and providing the sleeve therebeyond with a smooth axial bore 42 of greater diameter than its threaded portion 41 for receiving a cap or disc 43 which is of correspondingly greater diameter than and may be welded or otherwise fixed to the end of the shank 27 after the latter has been threaded into the sleeve, the cap 43, thereafter, on reaching the threaded portion serving to prevent further extension of the coupling.

Once the transition coupling has had its clevis 35 engaged with the draw hook 3 and the slack between the buffers 6 has been taken up, the coupling under draft forces will pull through the eye-bolt 26 and the dog 8 against the knuckle 10 and guard arm 9 of the automatic coupler 2. Conversely, under buffing forces, the vertical pivotability of the eye-bolt 26 relative to the body 20 of the dog 8 and of the clevis 35 relative to the collar 30 about the trunnions 32, then held in horizontal disposition by engagement of the clevis with the draw hook, will cause the linkage 13 to fold or break vertically. To ensure that this folding or breaking is not upward with consequent possible disengagement of the clevis 35 from the draw hook 3, but downward, the eye 28 on the eye-bolt 26 has its periphery interrupted by a substantially tangentially projecting abutment 44, which in normal position confronts and under buffing forces shifting the eye-bolt and dog rearwardly is adapted to engage the rear wall 45 of the throat 7 of the coupler above the opening 46 therein receiving the knuckle tail 47 and thus, by kicking the front end of the eye-bolt downwardly, ensure the desired downward breaking.

Due to the lesser clearance with the buffers 6 touching between the automatic coupler 2 and draw hook 3 than is provided between a pair of draw hooks and the desirability of relieving the coupling means in toto, including the coupler and draw hook, as well as the transition coupling, of buffing forces, it is preferable correspondingly to reduce the maximum travel obtainable in the buffers so that the latter will go solid at the point where such forces otherwise would be transmitted through the connecting means. Such reduction in travel readily is accomplishable in conventional double stroke buffers, such as those illustrated, by blocking out rearward movement of the intermediate pistons 48 of the buffers, flanking the automatic coupler 2, as by replacement of the usual resilient means by blocks 49 of wood or like material, this eliminating some 1⅜ inches of travel in these buffers and reducing the combined travel of the confronting buffers to 9⅜ inches, the foldup obtainable in the transition coupling to the point of contact of the coupler and draw hook.

It has been mentioned that the dog 8 is so pivotally connected to the guard arm 9 of the coupler 2 as to be swingable clear of, as well as into, the throat 7 of the coupler. As will be noted from Figure 1, the dog 8 is able to swing through an obtuse angle of almost 180 degrees, so that while, at the inner limit of the swing, the free end portion 21 of the dog is substantially normal to the longitudinal center line of the coupler, at the opposite or outer limit, the other end portion or boss 15 is substantially normal to the same center line. With such an extensive swing, the linkage 13 of the transition coupling, when the dog is swung outwardly, is brought into confronting relation with the end 4 of the car or other vehicle (not shown) equipped with the automatic coupler and may readily be hung by its clevis 35 on a bracket 50 fixed to the end 4 at the guard arm side of the coupler and carrying a hook 51. By disposing the hook 51 of the bracket 50 substantially at the height or on the level of the dog 8, the full play in the transition coupling, both between the dog 8 and the linkage 13 and within the latter, is made available for movement of the coupler under service conditions relative to the car. As a consequence, not only does the bracket 50 permits the transition coupling to be stored out of the way when not in use, but the transition coupling, when so stored, provides sufficient slack so as in nowise to interfere with the operation of the coupler as an automatic coupler.

From the above detailed description, it is apparent that there has been provided an improvement transition coupling which is designed to be connected to an automatic coupler at all times during the transition period, when in use provides a foolproof, takeup-able connection between the coupler and a draw hook and, when not in use, may be swung out of the way and attached at one side to the end of the car without interfering with the operation of the automatic coupler. It should be understood that the described and disclosed embodiment is merely exemplary of the invention and that all modifications are intended to be included which do not depart from either the spirit of the invention or the scope of the appended claims.

Having described my invention, I claim:

1. The combination with an automatic knuckle coupler, of a transition coupling for connecting said coupler to a draw hook, said coupling comprising connecting means pivotally connected to said coupler for swinging into and clear of a throat thereof, said connecting means when in said throat and with a knuckle of said coupler closed being adapted to pull against said knuckle and a guard arm of said coupler, a vertically foldable linkage pivotally connected to said connecting means and connectable to said draw hook, said linkage in pulling position projecting into said throat, and means carried by said connecting means for limiting outward movement of said linkage relative thereto.

2. The combination with an automatic knuckle coupler, of a transition coupling for connecting said coupler to a draw hook, said coupling comprising connecting means pivotally connected to said coupler for swinging into and clear of a throat thereof, said connecting means when in said throat and with a knuckle of said coupler closed being adapted to pull against said knuckle and a guard arm of said coupler, a vertically foldable linkage pivotally connected to said connecting means and connectable to said draw hook, said linkage in pulling position projecting into said throat, takeup means in said linkage for taking up slack in the connection between said coupler and draw hook, and means carried by said connecting means and operative over the range of pivotal movement thereof for locking said linkage thereto.

3. The combination with an automatic knuckle coupler, of a transition coupling for connecting said coupler to a draw hook, said coupling comprising a dog pivotally connected to a guard arm of said coupler and swingable relative thereto substantially horizontally into and clear of a throat of said coupler, said dog when in said throat and with a knuckle of said coupler closed being adapted to bear at its free end and pull against an inner face of said knuckle, a longitudinally adjustable vertically foldable linkage connected for relative vertical pivoting to said dog and connectable to said draw hook, and stop means on a free end portion of said dog for preventing removal thereover of said linkage.

4. The combination of an automatic knuckle coupler having a horizontally directed slot in a guard arm thereof, a dog having an end fitting in said slot and pivotally connected to said guard arm for horizontal swinging into and clear of a throat of said coupler, said dog when within said throat and with a knuckle of said coupler closed being adapted to bear and pull against said knuckle, a vertically foldable and takeup-able linkage pivotally connected to said dog and connectable to a draw hook, and stop means on a free end portion of said dog for preventing removal thereover of said linkage.

5. The combination with an automatic knuckle coupler mounted in and projecting from a vehicle end, of a transition coupling for connecting said coupler to a draw hook, said coupling comprising connecting means pivotally connected to a guard arm of said coupler and swingable substantially horizontally into and clear of a throat thereof, said connecting means when in said throat and with a knuckle of said coupler closed being adapted to bear and pull against said knuckle, a longitudinally adjustable vertically foldable linkage pivotally connected at one end to said connecting means and connectable at its other end to said draw hook, means carried on a free end portion of said connecting means for preventing removal thereover of said linkage, and bracket means attached to said vehicle end at the guard arm side of said coupler and engageable by said other end of said linkage for supporting said linkage without interfering with automatic coupling of said coupler.

6. The combination with an automatic knuckle coupler mounted in and projecting from a vehicle end, of a transition coupling for connecting said coupler to a draw hook, said coupling comprising connecting means pivotally connected to a guard arm of said coupler and swingable substantially horizontally into and clear of a throat thereof, said connecting means when in said throat and with a knuckle of said coupler closed being adapted to bear and pull against said knuckle, a longitudinally adjustable vertically foldable linkage pivotally connected at one end to said connecting means and connectable at its other end to said draw hook, means carried on a free end portion of said connecting means for preventing removal thereover of said linkage, and hook means attached to said vehicle end at the guard arm side of said coupler and substantially on the level of said connecting means and engageable by said other end of said linkage for supporting said linkage without interfering with automatic coupling of said coupler.

7. The combination with an automatic knuckle coupler of a transition coupling for connecting said coupler to a draw hook, said coupling comprising a dog having an end fittable into a slot in and pivotally connected to a guard arm of said coupler, a longitudinally adjustable vertically foldable linkage pivotally connected at one end to said dog and at its other end to a draw hook, stop means carried by said dog adjacent a free end thereof for limiting outward movement of said one end of said linkage relative thereto, said dog being swingable substantially horizontally into and clear of a throat of said coupler, and said dog when in said throat and with a knuckle of said coupler closed spanning the space between said guard arm and knuckle and being adapted to bear and pull against said knuckle.

8. The combination with an automatic knuckle coupler of a transition coupling for connecting said coupler to a draw hook, said coupling comprising a dog having an end fittable into a slot in and pivotally connected for relative substantially horizontal swinging to a guard arm of said coupler and swingable into and clear of a throat thereof, a longitudinally adjustable vertically foldable linkage pivotally connected at one end to said dog and at its other end to said draw hook, stop means carried by said dog adjacent a free end thereof for limiting outward movement of said one end of said linkage relative thereto, said dog when in said opening and with a knuckle of said coupler closed spanning the space between said knuckle and guard arm and being adapted to bear through said stop means against a rear face of said knuckle.

9. The combination with an automatic knuckle coupler of a transition coupling for connecting said coupler to a draw hook, said coupling comprising a dog having an end fitting into a slot in and pivotally connected for substantially horizontal relative swinging to a guard arm of said coupler, shoulder means on a free end portion of said dog and adapted to bear against and seat an inner face of a knuckle of said coupler with said knuckle in closed position and said dog in a throat of said coupler, a vertically foldable linkage having one end pivotally connected to said dog intermediate ends thereof and limited in outward movement relative thereto by said shoulder means, said linkage having its other end connectable to said draw hook, and takeup means intermediate said ends of said linkage for extending and contracting said linkage.

10. The combination with an automatic knuckle coupler of a transition coupling for connecting said coupler to a draw hook, said coupling comprising a dog having an end fitting into a slot in and pivotally connected for substantially horizontal relative swinging to a guard arm of said coupler, shoulder means on a free end portion of said dog and adapted to bear against and seat an inner face of a knuckle of said coupler with said knuckle in closed position and said dog in a throat of said coupler, a vertically foldable linkage having one end pivotally connected to said dog intermediate ends thereof and limited in outward movement relative thereto by said shoulder means, said end in a pulling position of said linkage projecting into said throat, said linkage having its other end connectable to said draw hook, and screw takeup means intermediate said ends of said linkage for extending and contracting said linkage.

11. The combination with an automatic knuckle coupler of a transition coupling for connecting said coupler to a draw hook, said coupling comprising a dog having an end fitting into a slot in and pivotally connected for substantially horizontal relative swinging to a guard arm of said coupler, shoulder means on a free end portion of said dog and adapted to bear against and seat an inner face of a knuckle of said coupler with said knuckle in closed position and said dog in a throat of said coupler, an eye-bolt having an eye encircling said dog intermediate ends thereof and limited in outward movement relative thereto by said shoulder means, an internally threaded sleeve encircling and threadedly engaging a threaded stem of said eye-bolt, a collar rotatably encircling said sleeve and limited in axial movement relative thereto, trunnions carried by and projecting radially from said collar, and a clevis pivotally connected to said collar through said trunnions and connectable to said draw hook.

12. The combination with an automatic knuckle coupler of a transition coupling for connecting said coupler to a draw hook, said coupling comprising a dog having an end fitting into a slot in and pivotally connected for substantially horizontal relative swinging to a guard arm of said coupler, shoulder means on a free end portion of said dog and adapted to bear against and seat an inner face of a knuckle of said coupler with said knuckle in closed position and said dog in a throat of said coupler, an eye-bolt having an eye encircling said dog intermediate ends thereof and limited in outward movement relative thereto by said shoulder means, an internally threaded sleeve encircling and threadedly engaging a threaded stem of said eye-bolt, a collar rotatably encircling said sleeve and limited in axial movement relative thereto, trunnions carried by and projecting radially from said collar, a clevis pivotally connected to said collar through said trunnions and connectable to said draw hook, and lever means connected to said sleeve for turning said sleeve on said stem and extending and contracting said coupling.

13. The combination with an automatic knuckle coupler of a transition coupling for connecting said coupler to draw hook, said coupling comprising a dog having an end fitting into a slot in and pivotally connected for substantially horizontal relative swinging to a guard arm of said coupler, shoulder means on a free end portion of said dog and adapted to bear against and seat an inner face of a knuckle of said coupler with said knuckle in closed position and said dog in a throat of said coupler, an eye-bolt having an eye encircling said dog intermediate ends thereof and limited in an outward movement relative thereto by said shoulder means, an internally threaded sleeve encircling and threadedly engaging a threaded stem of said eye-bolt, a collar rotatably encircling said sleeve, means at one end of said sleeve for limiting axial movement of said collar in one direction relative thereto, trunnions carried by and projecting radially from said collar, a clevis pivotally connected to said collar through said trunnions and connectable to said draw hook, means at the other end of said sleeve and cooperating with said means at said one end for limiting relative axial movement of said sleeve and collar in either direction, and a lever connected to said last named means for turning said sleeve on the stem of said eye-bolt and extending and contracting said coupling.

14. The combination with an automatic knuckle coupler of a transition coupling for connecting said coupler to a draw hook, said coupling comprising a dog having an end fitting into a slot in a pivotally connected for substantially horizontal relative swinging to a guard arm of said coupler, shoulder means on a free end portion of said dog and adapted to bear against and seat an inner face of a knuckle of said coupler with said knuckle in closed position and said dog in a throat of said coupler, an eye-bolt having an eye encircling said dog intermediate ends thereof and limited in outward movement relative thereto by said shoulder means, an internally threaded sleeve encircling and threadedly engaging a threaded stem of said eye-bolt, a collar rotatably encircling said sleeve, means at one end of said sleeve for limiting axial movement of said collar in one direction relative thereto, trunnions carried by and projecting radially from said collar, a clevis pivotally connected to said collar through said trunnions and connectable to said draw hook, means at the other end of said sleeve and cooperating with said means at said one end for limiting relative axial movement of said sleeve and collar in either direction, a lever connected to said last named means for turning said sleeve on the stem of said eye-bolt and extending and contracting said coupling, and means for limiting outward movement of said sleeve relative to said stem.

15. The combination with an automatic knuckle coupler of a transition coupling for connecting said coupler to a draw hook, said coupling comprising a dog having an end fitting into a slot in and pivotally connected for substantially horizontal relative swinging to a guard arm of said coupler, a pair of opposed vertically directed shoulders projecting from a free end portion of said dog and having forwardly facing cavities conforming in contour to and adapted to seat a rear face of a closed knuckle of said coupler, a substantially horizontally directed tongue on said end portion intermediate and projecting forwardly from said shoulders and seatable in a rearwardly opening recess interrupting said face, and a longitudinally adjustable vertically foldable linkage having one end pivotally connected to said dog intermediate ends thereof and limited in outward movement relative thereto by said shoulders, said linkage having its other end connectable to said draw hook.

16. The combination with an automatic knuckle coupler of a transition coupling for connecting said coupler to a draw hook, said coupling comprising a dog having an end fitting into a slot in and pivotally connected for substantially horizontal relative swinging to a guard arm of said coupler, stop means on a free end portion of said dog and adapted to bear against and seat an inner face of a knuckle of said coupler with said knuckle in closed position and said dog in a throat of said coupler, a linkage including an eye-bolt having an eye encircling said dog intermediate ends thereof and limited in outward movement relative thereto by said stop means, a sleeve encircling and threadedly engaging a stem of said eye-bolt, a clevis connected for relative rotation to said sleeve and for vertical folding to said eye-bolt and connectable to said draw hook, and abutment means projecting from said eye and engageable with a rear wall of said throat above a knuckle tail receiving opening therein for kicking the stem of said eye-bolt down and forcing said linkage to fold downwardly under buffing forces.

17. The combination with an automatic knuckle coupler of a transition coupling for connecting said coupler to a draw hook, said coupling comprising a dog having an end fitting into a slot in and pivotally connected for substantially horizontal relative swinging to a guard arm of said coupler, shoulder means on a free end portion of said dog and adapted to bear against and seat an inner face of a knuckle of said coupler with said knuckle in closed position and said dog in a throat of said coupler, a longitudinally adjustable vertically foldable linkage having one end encircling said dog intermediate ends thereof and limited in outward movement relative thereto by said shoulder means, said linkage having its other end connectable to said draw hook, and means on said one end of said linkage and engageable with a rear wall of said throat above a knuckle tail receiving opening therein for forcing said linkage to fold downwardly under buffing forces.

18. The combination with an automatic knuckle coupler of a transition coupling for connecting said coupler to a draw hook, said coupling comprising a dog having an end fitting into a slot in and pivotally connected for substantially horizontal relative swinging to a guard arm of said coupler, shoulder means on a free end portion of said dog and adapted to bear against and seat an inner face of a knuckle of said coupler with said knuckle in closed position and said dog in a throat of said coupler, a vertically foldable and takeup-able linkage having one end encircling said dog intermediate ends thereof and limited in outward movement relative thereto by said shoulder means, said linkage having its other end connectable to said draw hook, and means on said one end of said linkage and engageable with a rear wall of said throat above a knuckle tail receiving opening therein for forcing said linkage to fold downwardly under buffing forces.

References Cited in the file of this patent

UNITED STATES PATENTS

| | | |
|---|---|---|
| 1,051,455 | Schmidt | Jan. 28, 1913 |
| 1,309,293 | McConway et al. | July 8, 1919 |
| 1,480,026 | Spence et al. | Jan. 8, 1924 |
| 1,599,038 | Bush | Sept. 7, 1926 |
| 1,614,518 | Willison | Jan. 18, 1927 |
| 1,927,268 | Kinne | Sept. 19, 1933 |

FOREIGN PATENTS

| | | |
|---|---|---|
| 678,771 | Great Britain | Sept. 10, 1952 |